US008277122B2

(12) United States Patent
Rudy et al.

(10) Patent No.: US 8,277,122 B2
(45) Date of Patent: Oct. 2, 2012

(54) GUIDE RAIL OF A LINEAR GUIDE

(75) Inventors: Dietmar Rudy, Kleinbundenbach (DE); Martin Menges, Homburg (DE); Mario Natale, Jaegersburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 460 days.

(21) Appl. No.: 12/524,401

(22) PCT Filed: Dec. 12, 2007

(86) PCT No.: PCT/EP2007/063793
§ 371 (c)(1),
(2), (4) Date: Jul. 24, 2009

(87) PCT Pub. No.: WO2008/089870
PCT Pub. Date: Jul. 31, 2008

(65) Prior Publication Data
US 2010/0040312 A1    Feb. 18, 2010

(30) Foreign Application Priority Data

Jan. 25, 2007  (DE) .......................... 10 2007 003 647
Feb. 27, 2007  (DE) .......................... 10 2007 009 461

(51) Int. Cl.
*F16C 29/02*      (2006.01)
*G01B 21/02*      (2006.01)

(52) U.S. Cl. .............................................. 384/8; 33/710
(58) Field of Classification Search ........ 384/8; 33/700, 33/706, 707, 708, 710; 324/207.24
See application file for complete search history.

(56) References Cited

U.S. PATENT DOCUMENTS 744,559 A * 11/1903 Kendrick ....................... 409/225
5,687,489 A * 11/1997 Tondorf et al. ................. 33/706

FOREIGN PATENT DOCUMENTS

| DE | 93 17 437 Y | 1/1994 |
| DE | 94 16 887 Y | 12/1994 |
| DE | 102 14 426 | 10/2003 |
| DE | 102 14 427 Y | 10/2003 |
| DE | 10 2005 021 345 Y | 11/2006 |
| EP | 15 17 055 Y | 3/2005 |

* cited by examiner

*Primary Examiner* — William C Joyce
(74) *Attorney, Agent, or Firm* — Lucas & Mercanti, LLP; Klaus P. Stoffel

(57) ABSTRACT

A guide rail of a linear guide, on guide surfaces on which a guide carriage is longitudinally displaceable. A material measure is arranged at a distance, preferably in parallel, to the guide rail and is fastened to the guide rail by means of a mount. The guide rail has a groove or a hole arranged outside the guide surface. The mount can be detachably fastened by means of expanding elements that engage with the groove or into the hole.

12 Claims, 4 Drawing Sheets

GUIDE RAIL OF A LINEAR GUIDE

This application is a 371 of PCT/EP2007/063793 filed Dec. 12, 2007, which in turn claims the priority of DE 10 2007 003 647.9 filed Jan. 25, 2007, and DE 10 2007 009 461.4 filed Feb. 27, 2007 the priority of these applications is hereby claimed and these applications are incorporated by reference herein.

FIELD OF THE INVENTION

The present invention relates to a guide rail of a linear guide, on the guide surfaces of which a guide carriage can be mounted so as to be longitudinally displaceable.

BACKGROUND OF THE INVENTION

Linear guides are often provided with a length measuring device so that a guide carriage guided longitudinally displaceably on the guide rail can be positioned satisfactorily by suitable drive and control means. DE 102 14 426 A1, for example, discloses a guide rail. The material measure arranged laterally next to the guide rail is held on the guide rail via a holder. The holder provides two approximately u-shaped brackets which are fastened in each case to one end of the material measure and which surround the guide rail. The u-shaped holding brackets, surrounding the guide rail, are braced with the latter, and the guide surfaces of the guide rail act as tension surfaces to releasably fasten the holding brackets. One disadvantage of a holder of this type may be seen in that a further guide carriage which is arranged on the guide rail is limited in its longitudinal displaceability by the arrangement of the two holding brackets which surround the guide rail.

SUMMARY OF THE INVENTION

The object of the present invention is to specify a guide rail, in which the disadvantage indicated above is avoided.

The object is achieved, according to the invention, by the guide rail which has, a plurality of guide carriages that can be moved one behind the other along the guide rail, without a collision or impact of the further guide carriage with the holder of the material measure occurring. The holder is fastened releasably at locations on the guide rail which lie outside the guide surfaces of the guide rail. The shape of the holder itself may be such that it lies outside a clearance profile of the guide carriage. The groove walls or the wall delimiting the hole are preferably oriented perfectly at right angles to the longitudinal axis of the guide rail. When the spreading means, formed, for example, by wedges, come to bear closely, while spreading open, against the groove walls or the wall of the hole, a perfect orientation of the holder of the guide rail can thus be assisted.

The holder may have a holding arm on which the material measure is held, the holding arm having a supporting surface, arranged along the guide rail, for supporting the holding arm on the guide rail. This supporting surface is preferably arranged perfectly parallel to the longitudinal axis of the material measure. The holding arm is supported and mounted with its supporting surface on a bearing surface of the guide rail. The bearing surface of the guide rail is oriented perfectly parallel to the longitudinal axis of the guide rail as a consequence of production. If, then, the holder is mounted with the holding arm, the supporting surface of the holding arm is oriented perfectly with respect to the bearing surface of the guide rail, the perfect orientation not being disturbed even after the bracing and spreading open of the spreading means.

Since the holder is preferably arranged outside the clearance profile of the guide carriage, there may be provision, for a sufficient extent of the supporting surface, for the latter to be formed on an angled part of the holding arm. This angled part can then be oriented parallel to the longitudinal axis of the guide rail.

In a particular exemplary embodiment for the releasable fastening of the holder on the guide rail, the spreading means have cooperating wedges, one of which is arranged fixedly to the holding arm and another of which is arranged moveably with respect to the one wedge. The wedges cooperate such that they come to bear in the groove against the groove walls of the latter and are pressed onto these. The wedges can bear with their mutually confronting wedge surfaces one against the other and can be braced with one another in the groove of the guide rail via a tension screw. By the tension screw being turned, the two wedges are displaced along their wedge surfaces and come to bear with their tension surfaces against groove walls of the groove. The one wedge may in this case be connected in one piece to the holding arm. The tension surfaces, facing away from one another, of the wedges are preferably arranged at right angles to the supporting surface of the holding arm, so that a satisfactory positioning of the holder and therefore for satisfactory positioning of the material measure with respect to the guide rail are possible.

The wedge assigned to the holding arm may also be designed as a double wedge which has two wedge legs which are arranged spaced apart, and which has mutually confronting wedge surfaces and tension surfaces, facing away from one another, for bearing against the two groove walls of the transverse groove. A moveable wedge engages between the two wedge legs which wedge can be pressed with its wedge surfaces against the wedge surfaces of the double wedge. For tensioning, a tension screw can be used which displaces the moveable wedge along the wedge surfaces by means of screwing movements.

For the simple introduction of the wedges, the groove in the foot region of the guide rail may advantageously be designed as a transverse groove arranged transversely with respect to the longitudinal axis of the guide rail. The wedges can consequently be inserted into the open transverse groove from below in a simple way.

BRIEF DESCRIPTION OF THE DRAWINGS

The invention is explained in more detail below with reference to three exemplary embodiments depicted in a total of seven figures in which.

DETAILED DESCRIPTION OF THE INVENTION

Figure 1:
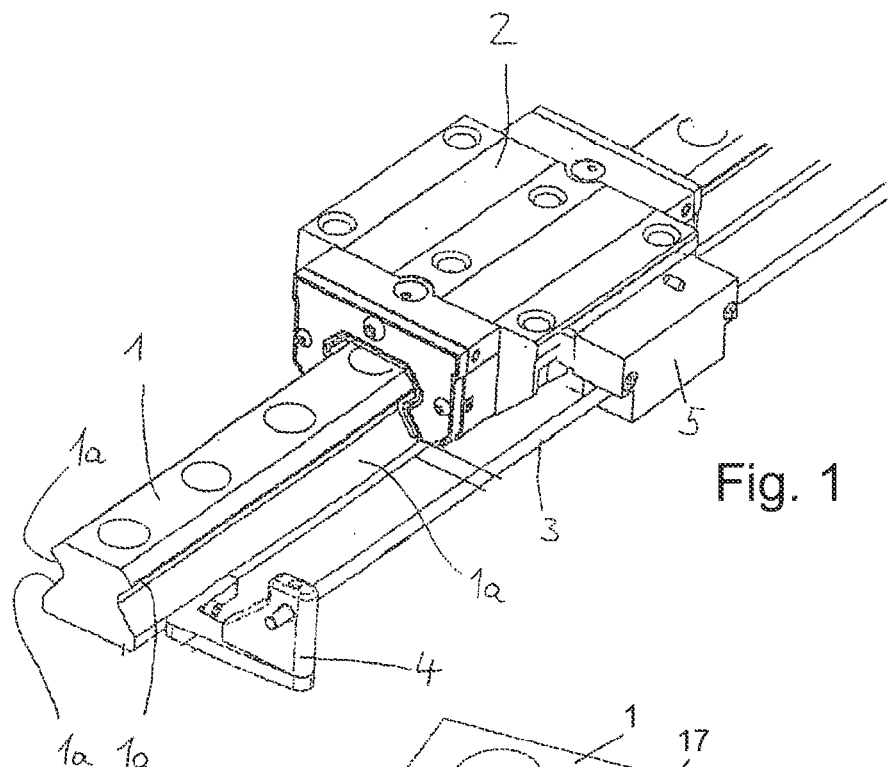
FIG. 1 shows a guide rail according to the invention with a mounted guide carriage in a perspective illustration.

A guide rail according to the invention is depicted in FIGS. 1 to 4. FIG. 1 shows the guide rail 1 with a mounted guide carriage 2. The guide carriage 2 is guided and mounted on guide surfaces 1a of the guide rail 1. Furthermore, a material measure 3 is provided, which is fastened releasably to the guide rail 1 via holders 4. Only one holder 4 is depicted in FIG. 1.

It can be gathered from FIG. 1 that a measuring head 5 is attached to the guide carriage 2, the measuring head 5 cooperating in a known manner with the material measure 3 so that predetermined positions on the guide rail can be moved up to in a controlled way.

Figure 2:
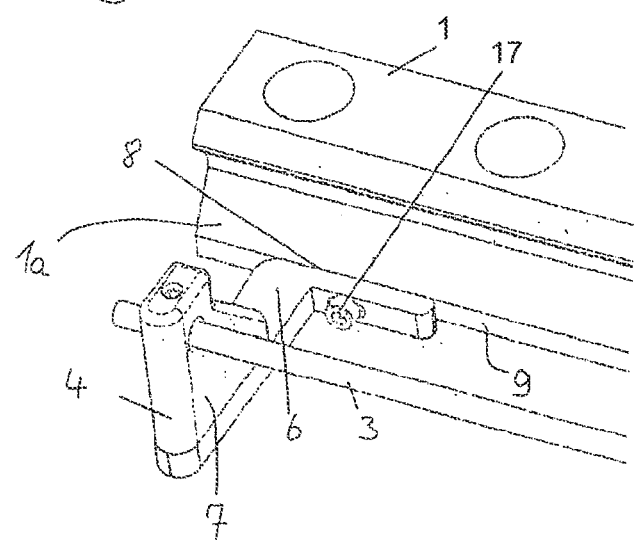
FIG. 2 shows a detail from FIG. 1.

FIG. 2 shows an enlargement of a detail from FIG. 1, in which, in particular, the holder 4 can be seen clearly. The holder 4 has a holding arm 6, the lower part of which is angled. A retainer 7 is placed onto the holding arm 6 and carries the material measure 3. The retainer 7 may also be formed in one piece with the holding arm 6. The holder 4 is dimensioned such that it is arranged outside the clearance profile of the guide carriage 2. Even if a further guide carriage is arranged on the guide rail 1, the risk of collision with the holder 4 is consequently ruled out.

The holding arm 6 is provided with a supporting surface 8 which is arranged along the guide rail 1 and by means of which the holding arm 6 is supported on a foot surface 9 of the guide rail 1. This foot surface 9 consequently also forms a bearing surface for the holder 4. The supporting surface 8 is arranged axially parallel to the material measure 3. The foot surface 9 of the guide rail 1 is likewise arranged axially parallel to the material measure 3 and outside the guide surfaces 1a.

Figure 3:
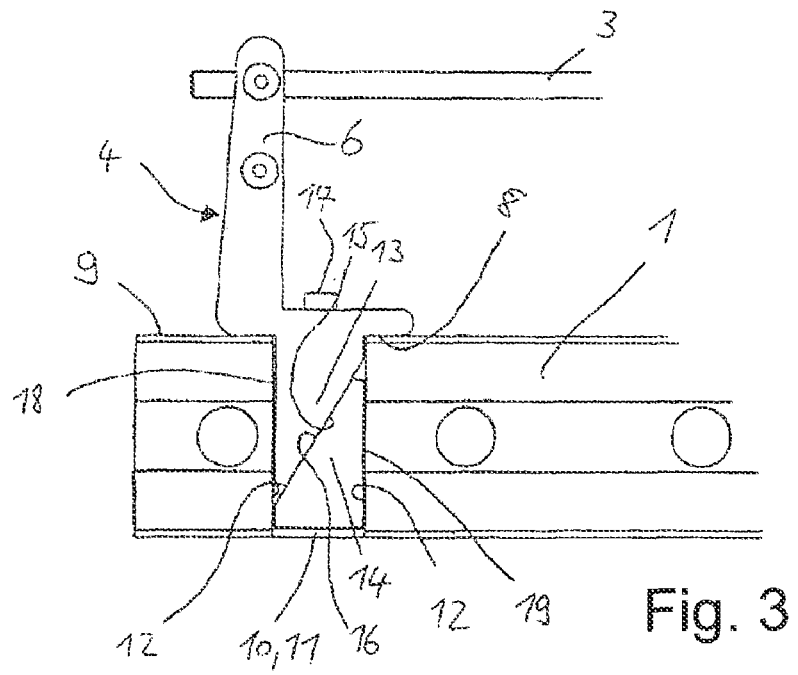
FIG. 3 shows a further detail from FIG. 1.

FIG. 3 shows the same detail as FIG. 2, but from the underside of the guide rail 1. It can be seen here that the guide rail 1 is provided in the foot region with a groove 10 which in the present case is designed as a transverse groove 11. This transverse groove 11, which is open to the foot side of the guide rail 1, is delimited by two groove walls 12 arranged parallel to one another, these groove walls 12 being arranged transversely with respect to the longitudinal axis of the guide rail 1. These groove walls 12 are arranged perfectly transversely with respect to the supporting surface 8 of the holder 4.

It can be gathered from FIG. 3 that a wedge 13 formed in one piece with the holding arm 6 engages into the transverse groove 11. A further wedge 14 is provided which is likewise arranged in the transverse groove 11, the two wedges 13, 14 bearing mutually confronting wedge surfaces 15, 16 one against the other, the two wedges 13, 14 being braced with respect to one another in the transverse groove 11 via a tension screw 17. The wedges 13, 14 are arranged so as to be movable along the wedge surfaces 15, 16 in order to set the intended bracing tension. The two wedges 13, 14 are both provided with tension surfaces 18, 19 which are arranged perfectly parallel to the groove walls 12 of the transverse groove 11.

Figure 4:
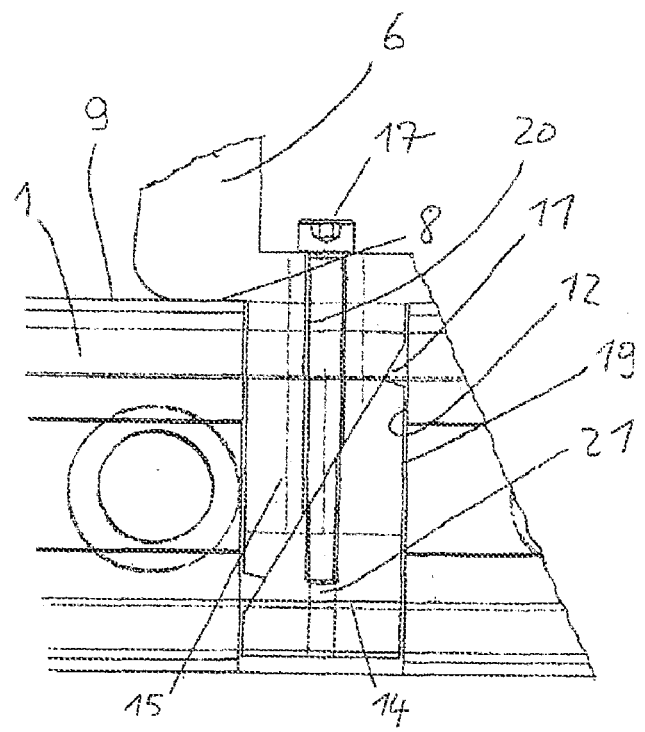
FIG. 4 shows an enlargement of a detail from FIG. 3.

It is clear from FIG. 4 how the two wedges 14, 15 cooperate with the tension screw 17 in order to allow bracing in the transverse groove 11. The wedge 15 is provided with a passage bore 20 and the wedge 14 with a threaded bore 21 aligned with this. The tension screw 17 is led through the passage bore 20 and engages with its external thread into the internal thread of the threaded bore 21. The diameter of the passage bore 20 is dimensioned such that the threaded shaft of the tension screw 17 has sufficient radial play to allow the displacement of the two wedges 13, 14 with respect to one another. By the tension screw being actuated, the wedge 14 is drawn towards the wedge 15, a parallel displacement of the two tension surfaces 18, 19 of the two wedges 14, 15 being generated. Finally, the two wedges 14, 15 come to bear with their tension surfaces 18, 19 against the groove walls 12 and bear closely there. A non-positive connection of the holder 4 to the guide rail 1 is then ensured.

Figure 5:
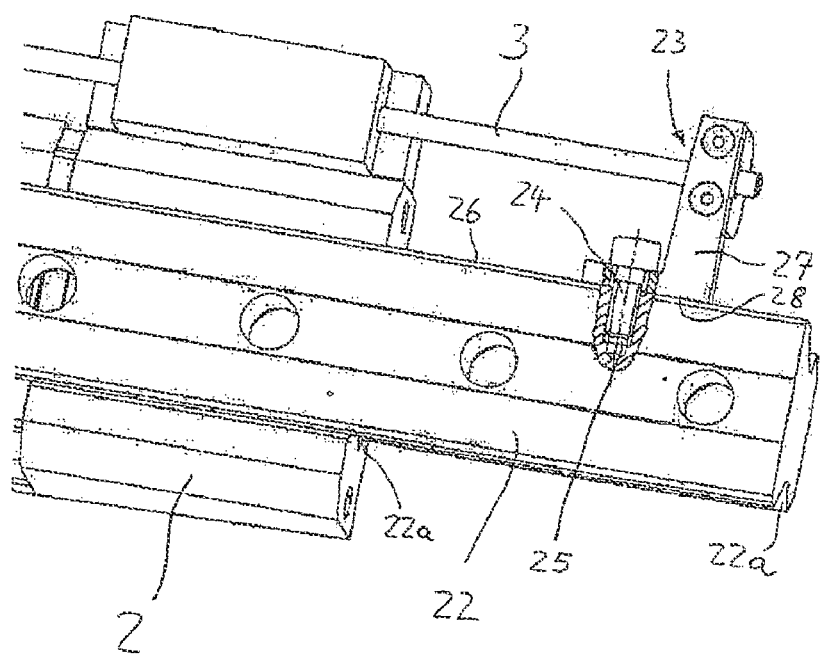
FIG. 5 shows a further fastening according to the invention of a holder.

FIG. 5 shows a detail of a further guide rail 22 according to the invention with a modified fastening of a holder 23, which differs from the exemplary embodiment described above essentially in that, instead of spreading means or wedges, merely one or more fastening screws 24 are provided which are screwed into matching threaded bores 25 on the guide rail 22. The threaded bore 25 is formed within a foot surface 26 of the guide rail 22. A holding arm 27 of the holder 23 is provided on its angled part with a supporting surface 28 which bears against the foot surface 26 of the guide rail 22. The holding arm 27 is provided with a passage bore 29 through which the fastening screw 24 is led. The angled part of the holding arm 27 is clamped between the screw head of the fastening screw 14 and the guide rail 22.

Figure 6:
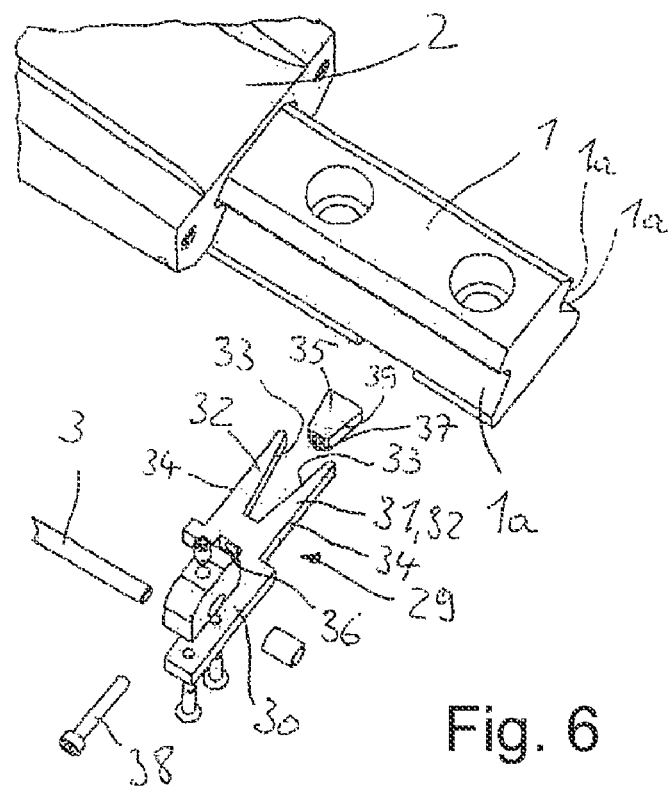
FIG. 6 shows a further guide rail according to the invention in a partially exploded illustration.
Figure 7:
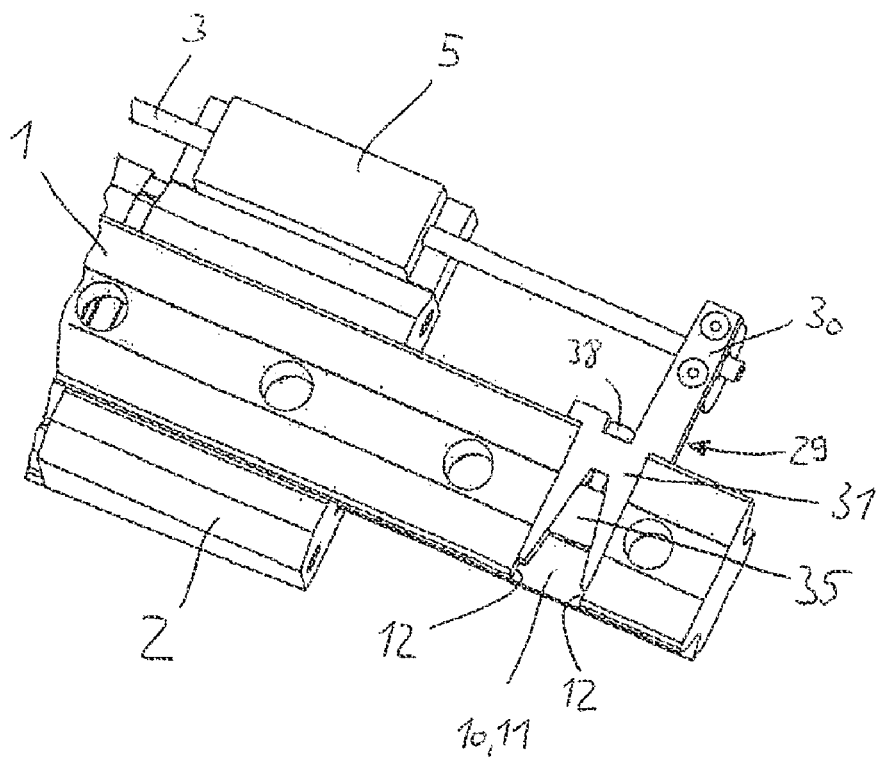
FIG. 7 shows the guide rail from FIG. 6, as seen from the underside.

FIGS. 6 and 7 show the guide rail 1 according to the invention, as in FIG. 1, with a modified holder 29. The holder 29 has a holding arm 30 on which the material measure 3 is held. A double wedge 31 is formed in one piece with the holding arm 30. The double wedge 31 comprises two wedge legs 32 arranged spaced apart from one another. The wedge legs 32 have mutually confronting wedge surfaces 33 and tension surfaces 34 facing away from one another.

The two wedge legs 32 delimit a v-shaped orifice into which a movable wedge 35 engages. The double wedge 31 is adapted to the transverse groove 11 and bears with its parallel tension surfaces 34 against the groove walls 12 of the transverse groove 11.

The double wedge 31 is provided with a passage bore 36 and the movable wedge 35 is provided with a threaded bore 37. A tension screw 38 is led through the passage bore 36 and engages into the threaded bore 37. By the tension screw 38 being tightened, the wedge 35 is drawn into the v-shaped orifice of the double wedge 31 until the wedge surfaces 39 of the wedge 35 butt against the wedge surfaces 33 of the wedge legs 32. Under a wedging action of the wedge 35, the wedge legs 32 are spread apart, the tension surfaces 34 being pressed against the groove walls 12 of the transverse groove 11.

The designs according to the invention, shown in FIGS. 1 to 4 and FIGS. 6 and 7, are suitable particularly for guide rails, the lateral foot surfaces of which are very narrow below the guide surfaces. In these cases, sometimes, there is not sufficient space for forming a threaded bore.

LIST OF REFERENCE NUMERALS

1 Guide Rail 22 Guide Rail
1a Guide Surface 22a Guide Surface
2 Guide Carriage 23 Holder
3 Material Measure 24 Fastening Screw
4 Holder 25 Threaded Bore
5 Measuring Head 26 Foot Surface
6 Holding Arm 27 Holding Arm
7 Retainer 28 Supporting Surface
8 Supporting Surface 29 Holder
9 Foot Surface 30 Holding Arm
10 Groove 31 Double Wedge
11 Transverse Groove 32 Wedge Leg
12 Groove Wall 33 Wedge Surface
13 Wedge 34 Tension Surface
14 Wedge 35 Movable Wedge
15 Wedge Surface 36 Passage Bore
16 Wedge Surface 37 Threaded Bore
17 Tension Screw 38 Tension Screw
18 Tension Surface 39 Wedge Surface
19 Tension Surface 20 Passage Bore
21 Threaded Bore

The invention claimed is:

1. A guide rail of a linear guide, comprising:
 guide surfaces on which a guide carriage is mounted, the guide carriage being longitudinally displaceable; and
 a material measure being arranged at a distance parallel to the guide rail and being fixed on the guide rail via a holder,
 wherein the guide rail has a groove arranged outside the guide surfaces, and the holder is fastened releasably via spreading means engaging into the groove,
 wherein the groove is formed in a foot region of the guide rail and the groove is a transverse groove that extends entirely across the guide rail transversely with respect to a longitudinal axis of the guide rail.

2. The guide rail as claimed in claim 1, wherein the holder has a holding arm on which the material measure is held, the holding arm having a supporting surface arranged along a foot surface of the guide rail supporting the holding arm.

3. The guide rail as claimed in claim 2, wherein the supporting surface and the foot surface are parallel to a longitudinal axis of the material measure.

4. The guide rail as claimed in claim 3, wherein the supporting surface is formed on an angled part of the holding arm.

5. The guide rail as claimed in claim 1, wherein the spreading means have cooperating wedges, one of the wedges being arranged fixedly to a holding arm and another one of the wedges being arranged moveably with respect to the one of the wedges arranged fixedly to the holding arm.

6. The guide rail as claimed in claim 5, wherein the wedges bear with their mutually confronting wedge surfaces, one against the other and are braced with respect to one another in the groove of the guide rail via a tension screw.

7. The guide rail as claimed in claim 5, wherein the one of the wedges arranged fixedly to the holding arm is arranged on an angled part of the holding arm.

8. The guide rail as claimed in claim 7, wherein the one of the wedges arranged fixedly to the holding arm is formed in one piece with the holding arm.

9. The guide rail as claimed in claim 7, wherein one of the wedges has or a plurality of the wedges together have outer tension surfaces for bearing against groove walls of the groove, the tension surfaces being arranged at right angles to the supporting surface of the holding arm.

10. The guide rail as claimed in claim 5, wherein the one of the wedges is arranged fixedly to the holding arm is a double wedge having two wedge legs spaced apart from one another and having mutually confronting wedge surfaces the wedge legs having tension surfaces facing away from one another for bearing against groove walls of the groove.

11. The guide rail as claimed in claim 10, wherein a moveable wedge engages between the wedge legs of the double wedge and is arranged with its wedge surfaces for bearing against wedge surfaces of the double wedge.

12. The guide rail as claimed in claim 11, wherein the moveable wedge is wedged with the double wedge by means of a tension screw and with the tension screw tightened, the two wedge legs being spread open and being pressed against the groove walls of the groove.

* * * * *